United States Patent [19]

Delfer, III

[11] E Patent Number: Re. 33,237

[45] Reissued Date of Patent: Jun. 19, 1990

[54] APPARATUS FOR PRODUCING HOLLOW PLASTIC ARTICLES

[75] Inventor: Frank W. Delfer, III, Calendon East, Canada

[73] Assignee: Husky Injection Molding Systems Ltd., Bolton, Canada

[21] Appl. No.: 297,499

[22] Filed: Jan. 13, 1989

Related U.S. Patent Documents

Reissue of:

[64] Patent No.: 4,721,452
Issued: Jan. 26, 1988
Appl. No.: 29,166
Filed: Mar. 23, 1987

[51] Int. Cl.[5] ..... B29C 45/42; B29C 45/72

[52] U.S. Cl. ..... 425/547; 264/328.14; 264/537; 425/533; 425/534; 425/556; 425/572; 425/577

[58] Field of Search ..... 425/526, 533, 534, 537, 425/547, 548, 556, 572, 574, 575, 577, 588; 264/328.4, 328.7, 328.8, 328.11, 328.14, 537

[56] References Cited

U.S. PATENT DOCUMENTS

| | | | |
|---|---|---|---|
| 3,149,373 | 9/1964 | Marzillier | 425/534 X |
| 3,183,552 | 5/1965 | Farkas | 425/534 X |
| 3,999,927 | 12/1976 | Kellogg | 425/534 |
| 4,011,039 | 3/1977 | Oas et al. | 425/534 X |
| 4,140,464 | 2/1979 | Spurr et al. | 264/537 X |
| 4,209,290 | 6/1980 | Rees et al. | 425/547 |
| 4,239,475 | 12/1980 | Rainville | 425/526 |
| 4,439,133 | 3/1984 | Rees et al. | 425/556 |
| 4,449,913 | 5/1984 | Krishnakumar et al. | 264/328.8 X |
| 4,470,796 | 9/1984 | Stroup et al. | 425/572 X |
| 4,527,970 | 7/1985 | Murley | 264/328.14 X |
| 4,586,891 | 5/1986 | Ichizawa et al. | 425/526 |
| 4,592,719 | 6/1986 | Bellehache et al. | 425/526 |
| 4,690,633 | 9/1987 | Schad et al. | 425/526 |

*Primary Examiner*—Richard L. Chiesa
*Attorney, Agent, or Firm*—Bachman & LaPointe

[57] ABSTRACT

The apparatus includes a carrier plate cooperating with an injection molding machine and having at least two sets of cavities therein for cooling the hollow plastic articles, with the number of cavities corresponding to a multiple of at least two times the number of hollow plastic articles produced in an injection molding cycle. The apparatus also includes means for aligning one set at a time of said carrier plate cavities to juxtapose said set of cavities with the hollow plastic articles formed in an injection molding cycle, and means for transferring said hollow plastic articles to said juxtaposed cavities.

7 Claims, 2 Drawing Sheets

APPARATUS FOR PRODUCING HOLLOW PLASTIC ARTICLES

Matter enclosed in heavy brackets [ ] appears in the original patent but forms no part of this reissue specification; matter printed in italics indicates the additions made by reissue.

BACKGROUND OF THE INVENTION

The present invention relates to the art of injection molding hollow plastic articles, especially hollow plastic articles which are subsequently reheated and blow molded into containers such as oriented hollow plastic containers. Polyethylene terephthalate (PET) is typical of the plastic material used.

The injection molded hollow plastic articles produced are preforms which are further processed. Naturally, a high rate of production is important in commercial operations, and the rate at which the injection molding cycle can produce preforms is limited by the time taken to cool the preforms sufficiently to allow post molding handling without damage to the preform.

The hollow plastic articles or preforms produced in the injection molding cycle generally have relatively thick walls, typically on the order of 0.060 to 0.160 inch, and are molded with PET resin at relatively high temperatures, typically of the order of 510° F. to 580° F. Consequently, after removal from the mold the hollow plastic articles must be cooled sufficiently to prevent their deformation or adhesion to one another. However, their thick wall acts as an insulator tending to trap heat inside the wall. Cooling the article in the mold by means of its contact with the cooled mold surfaces quickly chills the inner and outer skins, but mold cooling will remove the heat trapped within the wall only by keeping the article in the mold for an extended period of time. Naturally, this is economically prohibitive.

Initially cooling the molded articles skin is sufficient to permit ejection from the mold without damage, but additional cooling is then immediately required to remove additional heat as it is conducted to the skin. If the additional cooling were omitted, the skin temperature would rise and cause the molded articles to stick together, to become prone to surface damage, to bend, or warp, and or to crystallize. Naturally, this is unacceptable.

U.S. Pat. No. 4,527,970 to Murley and 4,586,891 to Ichizawa et al. cool the molded articles in the mold, followed by ejection and dropping onto a conveyor which transports the articles through an air cooled chamber. The mold cooling is sufficient to prevent the articles from sticking together as they drop onto the conveyor and the additional cooling provided downstream removes remaining heat in the thick walls. However, the machines are cumbersome and not entirely reliable. Also, the parts lose their orientation and must be unscrambled before downstream blowing operation.

Additional approaches to this problem are shown in U.S. Pat. No. 4,439,133 to Rees et al. and 4,449,913 to Krishnakumar et al. These patents show turret type injection molding systems wherein one of the turret stations in the operating cycle is used for the additional cooling. This approach will speed up the molding cycle, but it requires a dedicated machine with the resultant disadvantage of high cost. In addition, there is a reduced flexibility for producing different sized molded articles.

A horizontal injection molding system has been provided with a molded article transporter or robot which carries the articles from the mold in cooled tubes. U.S. Pat. No. 4,592,719 to Bellehache et al. shows air cooled tubes, and U.S. patent application Ser. No. 733,969 to Schad et al., filed May 14, 1985, and now U.S. Pat. No. 4,690,633, shows water cooled tubes which are tapered to maintain good surface contact with the molded articles as they shrink during cooling. This latter approach especially has effectively further reduced the time required for mold cooling and increased the production rate. However, the overall molding cycle has now been reduced to the point that there is insufficient time left for the molded articles to be completely cooled in the transporter or robot before it is needed to retrieve the molded articles from the next molding cycle. In order not to delay the molding cycle, the molded articles may be discharged from the transporter into another cooling device downstream. Naturally, this incurs additional cost, but also disadvantageously exposes the molded articles to increased risk of damage.

U.S. Pat. No. 4,209,290 to Rees et al. shows a vertical machine including an air cooled molded article transfer box to carry the partially cooled articles from the mold to the discharge station. The articles are hung vertically by their open ends which helps prevent bending of the articles during this cooling stage. However, this device has the capacity to handle the output from only one molding cycle thus limiting the amount of cooling that can be conveniently accomplished before the next molding cycle is completed.

It is therefore the principal object of the present invention to provide an apparatus for producing hollow plastic articles by injection molding enabling the attainment of a rapid operating cycle with extended cooling of the hollow articles.

It is a further object of the present invention to provide an apparatus as aforesaid which permits rapid injection molding cycles without the necessity for extended cooling time in the injection mold.

It is a still further object of the present invention to provide an apparatus as aforesaid using a transporter or carrier plate cooperating with an injection mold for extended cooling of hollow plastic articles formed therein accepting the articles from more than one injection molding cycle.

Further objects and advantages of the present invention will appear hereinafter.

SUMMARY OF THE INVENTION

In accordance with the present invention it has now been found that the foregoing objects and advantages may be readily obtained and an improved apparatus provided for producing hollow plastic articles.

The apparatus of the present invention comprises: an injection molding machine including a first mold portion having at least one cavity therein and a second mold portion having at least one elongate core seating in said cavity in a mold-closed position to form a first number of hot hollow plastic articles in an injection molding cycle, preferably a plurality of first and second mold portions, and means for reciprocating said mold portions from said mold-closed position to a mold open position forming a gap between said mold portions; a carrier plate having at least two sets of cavities therein, and preferably three sets of cavities, for cooling the hollow plastic articles, with the number of cavities corresponding to a multiple of at least two times the number of hollow plastic articles produced in an injection molding cycle; means for moving the carrier plate into and out of said gap; means for aligning one set at a time of said carrier plate cavities to juxtapose said aligned set of cavities with the hollow plastic articles formed in an injection molding cycle; and means for transferring the hollow plastic articles to the juxtaposed cavities. Means are provided for removing the hollow plastic articles from a first set of carrier plate cavities at a position spaced from said gap after transfer of hollow plastic articles to a second set of carrier plate cavities from a second injection molding cycle.

In a preferred embodiment the sets of carrier plate cavities are spaced apart and the alignment means includes a plurality of projections spaced apart by a distance corresponding to the spacing of the sets of carrier plate cavities.

Thus, the apparatus of the present invention effectively, economically and expeditiously provides a means to cool the injection molded, hollow plastic articles using a carrier plate or robot cooperating with the injection molding device permitting the injection molding device to operate at virtually any effective operating cycle. The carrier plate is suitable for cooling products from a plurality of injection molding cycles and enables convenient discharge therefrom after the articles are cooled sufficiently to be handled without incurring damage. A highly advantageous rapid operating cycle results.

Further features of the present invention will appear hereinbelow.

BRIEF DESCRIPTION OF THE DRAWINGS

The above and other features of the present invention will now be described in detail with reference to the accompanying drawings in which.

DETAILED DESCRIPTION

Figure 1:
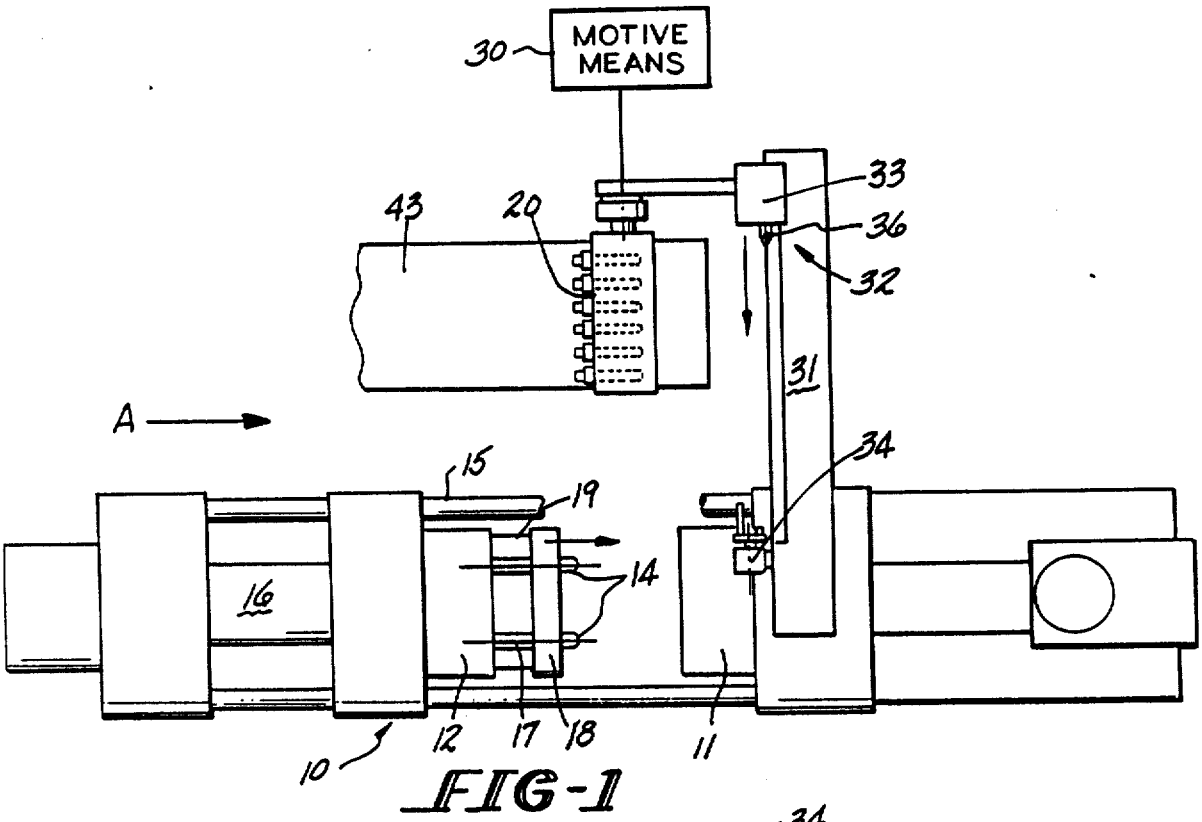
FIG. 1 is a plan view of an apparatus for producing hollow plastic articles according to the present invention.

FIG. 1 shows an apparatus for producing hollow plastic articles according to the present invention including a horizontal injection molding machine 10 comprising a multicavity machine. Naturally, the number of cavities and the arrangement thereof shown in the drawings are exemplificative and any convenient number of cavities and arrangement thereof may be employed. Indeed, one may also use a single cavity arrangement, although multicavity arrangements are preferred for economic reasons.

Figure 2:
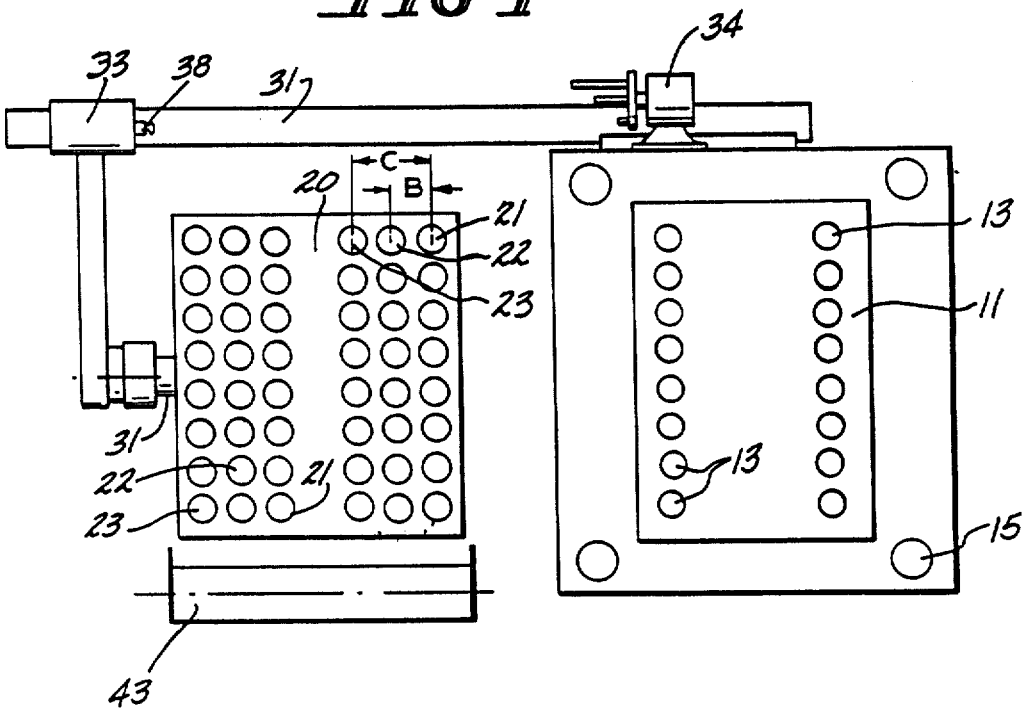
FIG. 2 is an end view of the mold cavity plate and the carrier plate in the direction of arrow "A" in FIG. 1, with the carrier plate in the outboard position or position spaced from the gap between the first and second mold portions.

Machine 10 includes a first mold portion 11 which is a cavity half and a second mold portion 12 which is a core half. First mold portion or cavity half 11 has at least one cavity 13 therein and preferably a plurality of said cavities. A representative cavity arrangement is shown in FIG. 2 which shows (2) spaced rows of cavities 13 with each row containing eight (8) cavities. Second mold portion or core half 12 has at least one elongate core 14 therein with the number of cores corresponding to the number of cavities. Cores 14 are each engageable with a respective cavity for seating therein in a mold-closed position to form a closed mold for the formation of a hollow plastic article therein by injection molding. The number of articles formed in an injection molding cycle will depend on the number of cavities and corresponding cores. Normally, the cores will reciprocate from a mold-closed position seated in said cavities for the formation of the hollow articles to a mold-open position spaced from said cavities forming a gap between the cores and cavities for ejection of the hollow articles. FIG. 1 shows the first and second mold portions in a mold-open position. The mold portions reciprocate on tie rods 15 powered by any convenient motive means, as by hydraulic cylinder 16, in a predetermined cycle. The plastic material is injected into the space formed between each core and cavity in the mold-closed position by known injection molding procedures.

It is preferred in accordance with the present invention to retain the formed hollow plastic articles on cores 14 after formation of the articles and upon reciprocation of the mold portions from the mold-closed position to the mold-open position. Retention of the plastic articles on the cores will be aided by shrinkage of the part onto the core. Removal of the hollow articles from the cores onto the carrier plate 20 may be accomplished by simply blowing air through suction lines 17 and/or by the use of stripper plate 18 reciprocating on guide pins 19.

Carrier plate or cooled robot storage plate 20 is provided having at least two sets of cavities therein for cooling the hollow plastic articles. The number of cavities in carrier plate 20 corresponds to a multiple of the arrangement of cavities 13 of first mold portion 11 and are a multiple of at least two (2) times the number of hollow plastic articles produced in an injection molding cycle. The embodiment shown in FIG. 2 includes a first set of carrier plate cavities 21 and a second set of carrier plate cavities 22 and a third set of carrier plate cavities 23. Note that each of sets 21, 22 and 23 correspond to the arrangement of first mold portion cavities 13, with each of said sets being spaced apart by a fixed distance.

It can be appreciated that the specific arrangement of first mold portion cavities 13 and sets 21, 22 and 23 are for purposes of illustration only and naturally many other arrangements can be readily used.

Thus, carrier plate 20 has a first set of cavities 21 identical in arrangement to first mold portion cavities 13, with the same positioning thereof. In addition, the first, second and third sets of carrier plate cavities 21, 22 and 23 are offset from the respective adjacent set by equal pitches. The first set of cavities 21 is offset from second set of cavities 22 by a first distance R, and is offset from the third set of cavities 23 by a second distance C. The pitches B and C are so arranged as to equally space the additional cavity arrangements in storage plate 20, with the additional sets of cavities being arranged in between the columns of the first set of cavities. Although two additional sets of cavities are shown in FIG. 2, this is only for illustration purposes. Naturally, other embodiments can include only one additional set of carrier plate cavities or several sets of carrier plate cavities depending upon the available space between the columns of cavities and particular requirements.

Figure 3:
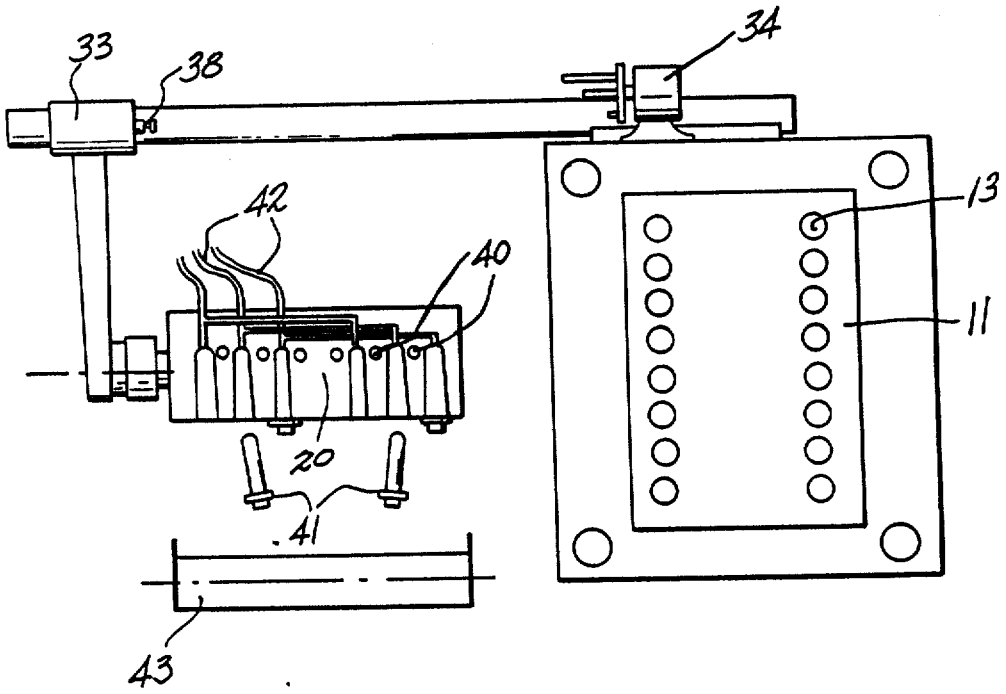
FIG. 3 is an end view similar to FIG. 2 showing the carrier plate in the discharge position.
Figure 4:
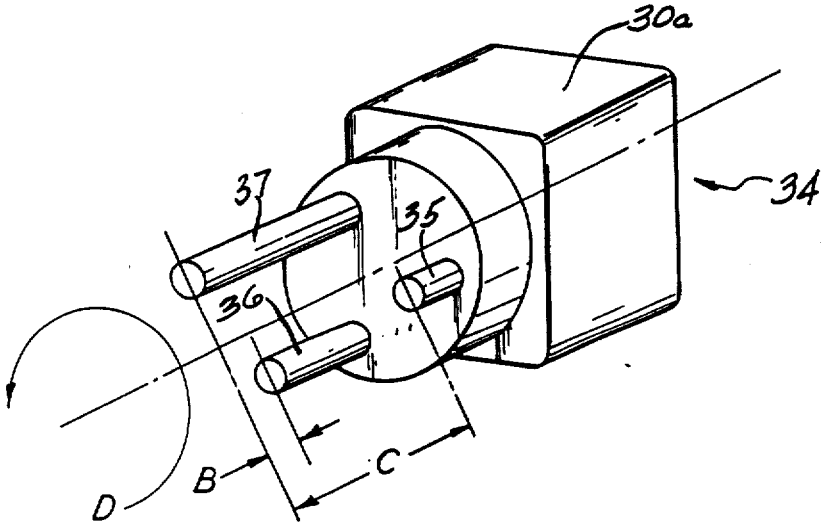
FIG. 4 is a perspective view of the spaced projections of the carrier plate alignment means.

FIGS. 1, 2 and 3 show carrier plate 20 in the outboard position or in the position spaced from the gap between the mold portions. Motive means 30, shown schematically in FIG. 1, are provided for moving carrier plate 20 into and out of said gap including slide 31 on which the carrier plate 20 is moved. Alignment means 32 is provided including a first portion thereof 33 in fixed relationship to the carrier plate and moveable with the carrier plate into and out of said gap and a second portion 34 engagable with said first portion for aligning one set 21, 22 or 23 at a time of said carrier plate cavities to juxtapose said aligned set of cavities with the hollow plastic articles formed in an injection molding cycle. The alignment means 32 is used to control the inboard or receiving position of the carrier plate 20 and carrier plate cavities 21, 22 or 23. The alignment means comprises a means to programmably select one of several receiving positions depending upon the specific set of cavities in the storage plate that have been selected to receive the hollow plastic articles from the mold. FIG. 4 shows the second portion 34 of a suitable alignment means or robot positioner 32 including a plurality of spaced apart projections 35, 36 and 37 spaced apart by a distance corresponding to the spacing of the sets of carrier plate cavities 21, 22 and 23. Thus, projections 35, 36, and 37 are of different lengths with the differences between the lengths corresponding to distances or pitches B and C of FIG. 2 showing the distances between the first and second sets of carrier plate cavities 21 and 22 and the first and third sets of carrier plate cavities 21 and 23. First alignment portion 33 includes end stop 38 engagable with one of projections 35, 36 or 37 of second alignment portion 34 so that alignment means 32 will stop carrier plate 20 at the receiving position which corresponds to the desired carrier plate cavity, e.g., projection 37 will stop carrier plates so that cavities 21 are aligned with first mold portion cavities 13 and cores 14 and the ejected hollow plastic articles will be loaded into cavity 21. By rotating second alignment portion 34, as for example in the direction of arrow D with motive means 30 coordinated with the movement of carrier plate 20, the appropriate alignment projection can be positioned to stop carrier plate 20 at the appropriate position on its next cycle. Thus, first projection 37 is longer than second projection 36 by an amount equal to distance B so that when first projection 37 is selected to engage end stop 38 first set of cavities 21 will be aligned with mold core 14 so that the hollow plastic article to be cooled will be aligned with said first set of carrier plate cavities 21. Similarly, by selecting second spaced projection 36, the second set of carrier plate cavities 22 will be aligned with mold core 14 for loading a second set of hollow plastic articles produced by a second injection molding cycle into second set 22.

Naturally, any convenient method may be selected for positioning carrier plate 20 in the gap between the first and second mold positions, for example by means of electrical DC servo drives. Controlling the drives by means of a microprocessor program causes the carrier plate to be positioned in different locations on the subsequent cycles.

The hollow plastic articles will transfer to the appropriate carrier plate cavities from mold cores 14 or from mold cavities 13, as for example with stripper plate 18. When one set of cavities, as set 21, in the carrier plate are filled with a set of hollow plastic articles corresponding to those produced in one injection molding cycle, the carrier plate is moved to a position spaced from the first and second mold positions and a second injection molding cycle is performed. The procedure is repeated and the hollow plastic articles produced in the second injection molding cycle are loaded into a second set of carrier plate cavities 22 for cooling in a manner similar to those loaded in the first cycle. The procedure is repeated for a third time whereupon those hollow plastic articles loaded in first set 21 have resided in carrier plate 20 for a period of time corresponding to the time necessary to load the three sets of hollow plastic articles into the carrier plate. Carrier plate 20 is provided with cooling passages 40 which may contain cooling fluid circulating therein for cooling the hollow plastic articles 41 held in the carrier plate. Carrier plate cavities 21, 22 and 23 may be connected to a source of fluid via passages 42 to aid in retention and ejection of the cooled hollow plastic articles 41.

Thus, when all the cavities in the carrier plate are filled with hollow plastic articles for cooling, those hollow plastic articles which were first loaded and have been subject to cooling the longest are discharged into an appropriate discharge receptacle, as for example, conveyor 43 spaced beneath carrier 20 in the outboard position. Preferably, a pallet system is used as disclosed in the aforesaid U.S. patent application Ser. No. 733,969 (the disclosure of which is hereby incorporated by reference) in order to maintain orientation of the preform to the next operation. In order to discharge, carrier plate 20 may be rotated through 90° by any desired motive means, as motive means 30, to orient the hollow plastic articles into a vertical plane so that they will be transferred to conveyor 43 below. The appropriate fluid transfer line 42 may be used to project the hollow plastic articles 41 from the appropriate set of carrier plate cavities onto conveyor 43. On the next cycle, carrier plate 20 is stopped by alignment means 32 in such a receiving position that the next set of hollow plastic articles is loaded into the set of carrier plate cavities just vacated.

By operating the carrier plate in this way, the hollow plastic articles can be stored in the carrier plate for the same number of cycles as there are sets of cavities inthe carrier plate, thus providing sufficient additional cooling of the hollow plastic articles so that upon discharge they will not incur damage from further handling.

If desired, each set of carrier plate cavities 21, 22 and 23 can be provided with tapered walls which match the taper in the corresponding mold cavity as described in aforementioned corresponding U.S. patent application Ser. No. 733,969, the disclosure of which is hereby incorporated by reference. Channels 42 are connected to the appropriate carrier plate cavities and to a source of vacuum (not shown) which is independently controllable for each set of carrier plate cavities. The operation of the lines 42 are coordinated through an appropriate central control means to insure that the hollow plastic articles are loaded into the storage plate cavities which are empty and held therein as long as necessary and are removed therefrom in the appropriate time.

The hollow plastic articles are therefore held in the appropriate storage plate cavities by the constant application of vacuum. If desired, they can simply be held therein by gravity and the cooling will be sufficient to insure the appropriate advantages of the present invention. However, vacuum hold will give preferred results. As the hollow plastic articles cool and shrink, their outer diameter is reduced and the vacuum causes the article to be drawn further into the cavity maintaining its contact with the cooled storage plate and further maintaining the shape of the hollow plastic article. It is possible that the hollow plastic articles will stick in the cavity due to the action of the taper. Typically, the taper is less than 7° included. This problem may be solved by removing the vacuum in the appropriate set of carrier plate cavities at the appropriate discharge time for said set and thereby subjecting the set to the force of gravity. If desired, the source of vacuum for the appropriate set may be replaced by a source of pressurized fluid to forcibly eject the appropriate set of hollow plastic articles from the storage plate cavity. This switching of vacuum to pressurized fluid may be achieved by known means and can be controlled by a programmable valve in a manner similar to controlling channels 17 in cores 14, if used, as described above.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An apparatus for producing hollow plastic articles which comprise:

an injection molding machine including a first mold portion having at least one cavity therein and a second mold portion having at least one elongate core seating in said cavity in mold-closed position to form a first number of hot hollow plastic articles in an injection molding cycle, and means for reciprocating said mold portions form said mold-closed position to a mold-open position forming a gap between said mold portions;

a carrier plate having at least two sets of cavities therein for cooling said hollow plastic articles, with the number of cavities corresponding to a multiple of at least two times the number of hollow plastic articles produced in an injection molding cycle;

means for moving the carrier plate into and out of said gap;

means for aligning one set at a time of said carrier plate cavities to juxtapose said aligned set of cavities with said hollow plastic articles formed in an injection molding cycle; and means for transferring said hollow plastic articles to said juxtaposed cavities.

2. An apparatus according to claim 1 including means for removing the hollow plastic articles from a first set of carrier plate cavities at a position spaced from said gap after transfer of hollow plastic articles to a second set of carrier plate cavities.

3. An apparatus according to claim 1 including three sets of carrier plate cavities corresponding to a multiple of three times the number of hollow plastic articles produced in an injection molding cycle and corresponding to the configurations of said first mold portion cavities.

4. An apparatus according to claim 1 including a plurality of mold portions for forming a plurality of hollow plastic articles in an injection molding cycle and a plurality of carrier plate cavities corresponding to a multiple of at least two times the number of hollow plastic articles produced in an injection molding cycle.

5. An apparatus according to claim 1 including means to transfer the hollow plastic articles to said elongate core from said mold cavity to leave the hollow plastic articles on said elongate core in the mold-open position.

6. An apparatus according to claim 1 wherein said sets of carrier plate cavities are spaced apart and wherein said alignment means includes a plurality of projections spaced apart by a distance corresponding to the spacing of said sets of carrier plate cavities.

*7. An apparatus for producing hollow plastic articles which comprise:*

*an injection molding machine including a first mold portion having at least one cavity therein and a second mold portion having at least one elongate core seating in said cavity in mold-closed position to form a first number of hot hollow plastic articles in an injection molding cycle, and means for reciprocating said mold portions from said mold-closed position to a mold-open position forming a gap between said mold portions;*

*carrier plate means having at least two sets of cavities therein for cooling said hollow plastic articles, with the number of cavities corresponding to a multiple of at least two times the number of hollow plastic articles produced in an injection molding cycle;*

*means for moving the carrier plate means into and out of said gap;*

*means for aligning one set at a time of said carrier plate means cavities to juxtapose said aligned set of cavities with said hollow plastic articles formed in an injection molding cycle; and*

*means for transferring said hollow plastic articles to said juxtaposed cavities.*

* * * * *